J. J. BATE.
LARD RENDERING KETTLE.
No. 18,271.  PATENTED SEPT. 29, 1857.
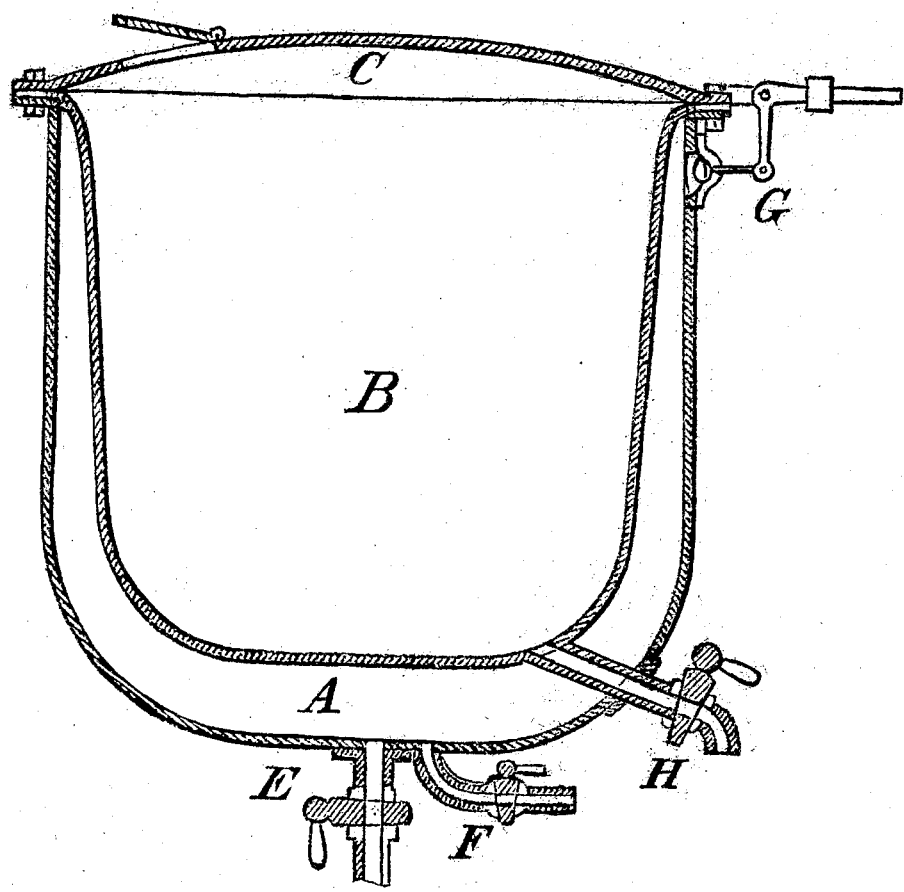
TAKEN FROM PATENT OFFICE REPORT
1857 - VOL. III
ONLY DRAWING ACCESSIBLE (1912)

UNITED STATES PATENT OFFICE.

JOHN J. BATE, OF BROOKLYN, NEW YORK.

LARD-RENDERING KETTLE.

Specification of Letters Patent No. 18,271, dated September 29, 1857.

*To all whom it may concern:*

Be it known that I, JOHN J. BATE, of Brooklyn, in the county of Kings and State of New York, have invented certain new and useful Improvements in Steam-Heated Kettles for Trying or Rendering Lard and other Fatty Substances; and I do hereby declare the following is a full and exact description of the same, reference being had to the accompanying drawing, showing a vertical longitudinal section of the same, and to the letters of reference marked thereon.

A is the outer shell, which surrounds and incloses the trying kettle, and which may be supported and incased in suitable brick work, the better to confine the heat within it and prevent its radiation, or which may be supported in any other manner, and be incased with felting or other nonconducting material to retain the heat. It may be made either of cast or wrought-plate iron as may be suited best to the size and capacity of the kettle.

B is the trying kettle, fastened and secured to the shell A by being bolted through suitable flanges formed on the top edge of each. It is made enough smaller in diameter and less in height than the shell A to form a space between the two in which steam can be introduced and circulated to heat it, as hereinafter described. It is preferred to make it of cast iron, or of plate-copper brazed together, when practicable, on account of the smooth inner surface that can be obtained by the use of those materials, and the absence of the seams and units attending its construction when made of plate-iron.

C is a detachable cover to the kettle, which may be removed and taken away when the kettle is to be cleaned out, or when it is to be filled with material, and which has an opening in it, closed by the cover D, through which the progress of the operation of the kettle may be watched.

E is a pipe from a steam boiler which is connected to the bottom of the shell A at its central point, so that the steam introduced through it shall diffuse itself equally throughout the space between the kettle and the shell. It has a stop cock inserted in it for the purpose of shutting off the supply of steam from the boiler when desired. By thus introducing the steam at the central point of the bottom of the shell and under the center of the bottom of the kettle I am enabled to heat the kettle more equably than it can be by introducing the steam at any other point.

F is the condensed-water pipe, connected to the shell at its bottom part and to the boiler below the water line, through which the water formed in the space between the shell and the kettle by the condensation of the steam admitted there is returned to the boiler. It has a stop cock inserted in it which requires to be closed when the stop cock in the steam pipe is closed to prevent the space between the kettle and the shell being filled with water from the boiler.

G is a puppet valve inserted in the upper part of the shell, and which opens inwardly, and which serves the purposes of both a snifting and a vacuum valve as hereinafter described. It is attached to a weighted lever, the weight upon the lever being so apportioned to the area of the valve as to produce a slight pressure upon the valve, say about two pounds to each square inch of the area of it, which opens the valve when the pressure of steam in the space between the kettle and the shell is reduced below the pressure put upon the valve.

H is a stop cock attached to the bottom part of the kettle, through which, when opened, the contents of the kettle are withdrawn.

The operation of my improvement is as follows: The kettle B having been charged with lard or other substance to be tried out or rendered, a slight pressure of steam, less than the pressure exerted on each inch of the area of the valve G by its weighted lever, is admitted to the space between the shell and the kettle, to drive out the air confined there through the aperture covered by the valve G, by a slight opening of the cock in the steam pipe E. After the confined air has been thus entirely driven out, and the space in which it was contained is filled with steam, the pressure of steam in the space named is increased by further opening the cock in the steam pipe, and through it the valve G is closed and remains so until the pressure of steam is reduced in the space as before noted. The cock in the water pipe F is now opened and the water formed by the steam being condensed by contact with the cooler surface of the kettle B is returned through that pipe to the boiler, so that the same water is used over and over and does not require to be added to except to make up for the small amount that may be lost by leakage. The pressure and supply of steam is kept up in the space between the shell and the kettle as described until the contents of the kettle are properly rendered or tried out, the progress of the operation being watched through the opening of the cover of the kettle; when the lard or other material is withdrawn from the kettle by opening the stop cock H, and the kettle is then cleaned out and is ready to be refilled with material to continue the operation as before. Where the pressure of steam is shut off from the space around the kettle and the pressure of steam in the space is reduced below the pressure exerted upon the valve G by its weighted lever, that valve opens and the space named is filled with air, so that the strain upon the shell and the liability of the shell to collapse or crush together by the pressure of the atmosphere upon its exterior surface induced by a vacuum being formed by the steam condensing in the space around the kettle after the supply of steam is shut off, is obviated.

The air which would be confined in the space between the kettle and the shell if the valve G was dispensed with would retard greatly the operation of the kettle, as it would be compressed into a space proportioned to the pressure of steam admitted to the space named and would remain fixed in that position, and being a poor conductor of heat would impede the heating of the kettle and require a longer time and a greater amount of steam (and of course fuel to produce the steam) to effect that purpose.

I do not claim as my invention the construction and combination of the kettle and the shell as described, nor the application, or use of steam to heat the kettle, nor the use of a snifting valve to permit the air confined in the space around the kettle to be discharged, nor the use of a vacuum valve to permit the air to fill the space around the kettle when a vacuum shall be formed there by the condensation of the steam contained therein, but What I do claim as my invention, and desire to secure by Letters Patent, is—

The combination of the valve G, acting both as a snifting and a vacuum valve, with the shell A and kettle B, as and for the purposes set forth.

JOHN J. BATE.

Witnesses:
SIDNEY LOW,
FRANCIS S. LOW.